United States Patent [19]

Molock et al.

[11] Patent Number: 4,859,780

[45] Date of Patent: Aug. 22, 1989

[54] HYDROPHILIC MODIFIER MONOMERS

[75] Inventors: Frank Molock, Lawrenceville; J. Richard Robertson, Jr.; Kai C. Su, both of Alpharetta, all of Ga.

[73] Assignee: Ciba-Geigy Corporation, Ardsley, N.Y.

[21] Appl. No.: 160,623

[22] Filed: Feb. 26, 1988

[51] Int. Cl.$^4$ .................. C07D 707/12; C07D 211/40; C07D 223/10
[52] U.S. Cl. .................................... 548/550; 540/531; 546/221; 546/243
[58] Field of Search ................ 540/531; 546/221, 243; 548/550

[56] References Cited

U.S. PATENT DOCUMENTS

| | | | |
|---|---|---|---|
| 3,903,110 | 9/1975 | Freyermuth et al. | 548/550 |
| 4,740,553 | 4/1988 | Su et al. | 523/106 |
| 4,780,488 | 10/1988 | Su et al. | 523/106 |

OTHER PUBLICATIONS

Aldrich Chemical Catalog, p. 1448.
Trade Bulletins of Rohm Tech, Inc.
Trade Bulletins of Sartomer Co.
Trade Bulletins of Alcolac.

Primary Examiner—Mary C. Lee
Assistant Examiner—MarySue Howard
Attorney, Agent, or Firm—Luther A. R. Hall; Irving M. Fishman

[57] ABSTRACT

Hydrophilic modifier monomers of the formula $[X-T]_{z'}G$ are disclosed wherein X is a reactive group, G is a hydrophilic group and T is a divalent linking group, $z'$ being a number up to the available valence of G, excess G valences being taken up by hydrogen. The monomers of the invention can be used to boost the hydrophilic nature of a wide variety of polymeric materials or be polymerized themselves with varying degrees of copolymerizable monomers. They are particularly suited for making hydrophilic contact lens materials.

5 Claims, No Drawings

HYDROPHILIC MODIFIER MONOMERS

FIELD OF THE INVENTION

The invention relates to modification of oligomers, particularly oligomers used in the manufacture of contact lenses, to increase hydrophilicity of resulting polymers and increase mold compatability in the manufacture of such molded polymers.

BACKGROUND OF THE INVENTION

There is an extensive body of literature on hydrophilic monomers in the art and a large number of such monomers are commercially available. These monomers impart hydrophilicity, water absorption, and/or improve the wetting properties of materials having them copolymerized therein over the same material absent such monomers. They also result in highly hydrophilic, highly absorbent, and highly wettable homopolymeric materials. These commercial monomers can be obtained from typical monomeric suppliers such as ROHM Tech, typically under the MHOROMER®D series; Sartomer; and Alcolac, typically under the SIPOMER® series.

A general characteristic of such known modifiers is that there is a hydrophilic group and a copolymerizable group. A typical example is N-vinyl pyrrolidone; another is hydroxyethylmethacrylate. Each of these is suitable for copolymerizing with other monomers or oligomers containing one or more free (meth)acrylic or vinylic groups. The addition of the free hydroxy or the amide increases the hydrophilicity, water absorbability and wettability of the resulting polymers over those not having such monomers present.

For many utilities, it is desired that the polymeric materials resulting therefrom be in molded form. This is typical in the field of contact lenses. Also frequently, molds are poly(methyl methacrylate) and copolymerizing (a) the aforementioned modifying monomers with (b) the monomers or oligomers being modified in such molds results in etching and scarring of the molds. This is extremely disadvantageous for ultimate polymer utilities which require mar free surfaces, i.e. high quality optical surfaces. In these situations, molds must be replaced extremely frequently resulting in high production costs and slowed production rates.

OBJECTS OF THE INVENTION

It is therefore an object of the invention to remedy the above defects and provide a hydrophilic monomer which will substantially reduce the amount of mold etching in preparing hydrophilically modified material.

Another object of the invention is to provide hydrophilically modified polymers.

Another object of the invention is to provide contact lenses having increased wettability and/or water absorption.

A still further object of the invention is to provide a contact lens which is surface modified by a hydrophilic modifier monomer.

DETAILED DESCRIPTION OF THE INVENTION

These are other objects can be realized by utilizing hydrophilic modifier monomers of the formula $$[X-T]_z-G \quad (I)$$

wherein G is a hydrophilic portion; T is a divalent linking group; and X is a group co-reactive or copolymerizable with other monomers.

The hydrophilic group G typically has one or more, preferably a plurality of, free or etherified hydroxy groups, amino groups, amides, urethanes, and/or other typically hydrophilic groups.

T is generally a divalent linking group which can be selected from a wide variety of divalent groups. The only general limit on T is that it can be linked to both G and X.

X is a polymerizable or reactive moiety selected from (a) ethylenically unsaturated radicals, preferably vinyl, 1- or 2-lower alkyl vinyl, more preferably 1-methyl vinyl, or 2-methyl vinyl, or allyl; (b) epoxy groups such as

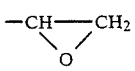

and glycidyl; (c) radicals of anhydrides such as maleic anhydride, phthalic anhydride, or acetic anhydride; (d) isocyanato; (e) thioisocyanto; (f) amino; (g) acyl, particularly carboxyl; (h) esters, especially of alcoholic or acid groups that are readily displaceable; (i) amido; (j) carbamoyl; (k) acid halides, especially carbonyl chloride; (l) ethers; and (m) hydroxy groups.

More specifically, T is selected from (a) a divalent aliphatic group of up to 25 carbon atoms, preferably an alkyl, an alkenyl, or an alkynyl group, preferably up to 20 carbon atoms, more preferably up to 15 carbon atoms, still more preferably up to 10 carbons atoms, and most preferably up to 5 carbon atoms, and preferably at least 2 carbon atoms, more preferably at least 4 carbon atoms, which aliphatic group may be interrupted, or terminated, or interrupted and terminated by an interrupting and/or a terminal group each being selected from

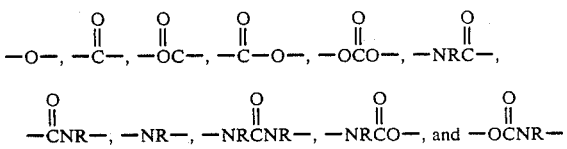

in which R is hydrogen or $C_{1-4}$ alkyl;

(b) a divalent 5–7 membered cycloaliphatic ring and a divalent (5–7 membered cycloaliphatic)-$C_{1-20}$ aliphatic, in which the non-cyclic portion is preferably alkyl, alkenyl, or alkynyl and preferably has up to 15 carbon atoms, more preferably up to 10 carbon atoms most preferably up to 5 carbons; and preferably has at least 2 carbon atoms, more preferably has at least 4 carbon atoms, and the non cyclic portion may be interrupted, or terminated, or interrupted and terminated by an interrupting group selected from those set forth in (a) above;

(c) a divalent arylene having 6–25 carbon atoms, preferably 6–18 carbon atoms, more preferably 6–10 carbon atoms, most preferably 6 carbon atoms;

(d) a divalent-(aliphatic)$_a$-aryl-(aliphatic)$_b$—wherein each of a and b is independently 0 or 1 and each aliphatic portion is independently selected from the same aliphatic groups set forth in (a) above and may be interrupted, or terminated, or interrupted and terminated as indicated in (a) above; and (e) a group of the formula $$+CH(R_a)-CH(R_b)-(CH_2)_n-O]_m CHCH(R_a)(R_b)-(CH_2)_p\cdot \quad (II)$$

wherein (i) $R_a$ is hydrogen, $R_b$ is methyl, and n and p are each zero; (ii) $R_a$ is methyl, $R_b$ is hydrogen, and n and p are each zero; or (iii) $R_a$ and $R_b$ are each hydrogen and n and p are each 1; and m is 8-100; and each group within (a) to (d) is unsubstituted or substituted by at least one substituent group selected from halogen, $C_{1-4}$ alkyl, and perhalo $C_{1-12}$ alkyl, z' is an integer of 1 up to the valence of G and where z' is less than the valence of G, the remaining valences are taken up with hydrogens; and G is a hydrophilic group selected from (i) morpholino; cyclic mono amide radicals of 5-7 ring members which are selected from carbon and 1 nitrogen; saturated and unsaturated cyclic radicals having 5-6 ring members of the formula $$\text{(III)}$$

the remaining ring members being carbons, cyclic amides having 6-7 ring members of the formula $$\text{(IV)}$$

wherein q and r are each independently 0-2, and cyclic amines of the formula $$\text{(V)}$$

having 5-6 ring members, the remaining members being carbon; each of which is unsubstituted or substituted by hydroxy $-C_{1-5}$ alkyl, carboxy, or lower alkyl;
(ii) tetrahydrofurfuryl;
(iii) mono, di and poly saccharide radicals, whether straight chain or cyclic, having up to 12 carbon atoms per saccharide unit, their corresponding sugar alcohol radicals, pentaerythritol radicals, and polyvinyl alcohols radicals; and
(iv) polyhydroxy $C_2$-$C_7$ alkyl radicals.

Preferably, X is vinylic group selected from $$\text{(a) } CHR^1=C(R^2)-\overset{O}{\overset{\|}{C}}-R^3 \quad (VI)$$

$$\text{(b) } CHR^1=C(R^2)-\underset{\text{phenyl}}{\bigcirc}-R^4 \quad (VII)$$

wherein
each of $R^1$ and $R^2$ is H or methyl,
$R^3$ is $-O-$ or $-NR^5-$ with $R^5$ being H or lower alkyl,
or
$R^2$ is H, lower alkyl or $-CN$ and
$R^3$ is lower alkylene or $-[CH_2CH(R^5)-O]-_{1-5}$; and
$R^4$ is $-O-$, $-NR^5-$, $-C(O)-$, $-OC(O)$, $-C(O)O-$, $-NR^5C(O)-$, $-NR^5C(O)O-$, $-C(O)NR^5-$, $-OC(O)NR^5-$, $-OC(O)O-$, or $-NR^5C(O)NR^5-$;

or X is an epoxy group of the formulae $$HC\underset{O}{\overset{}{\diagdown\diagup}}CH-(CH_2)_{1-3}$$

or $$-(CH_2)_{1-3}-CH\underset{O}{\overset{}{\diagdown\diagup}}CH-(CH_2)_{1-2}-$$

or X is an anhydride of the formulae $$\text{(VIII)}$$

or $$\text{(IX)}$$

wherein at least one of $R^6$ and $R^7$ in formula VIII and at least one of $R^6$-$R^8$ in formula IX is a bond, the others being a bond, hydrogen, lower alkyl or two adjacent groups $R^6$-$R^8$ together with the atoms to which they are attached from a $C_{5-8}$ cycloalkyl or cycloalkenyl ring or form a benzene or naphthalene ring; and the unsaturated analogs thereof;

or X is an anhydride of the formula $$B-\overset{O}{\overset{\|}{C}}-O-\overset{O}{\overset{\|}{C}}-B \quad (X)$$

wherein B is $C_1$-$C_6$ alkyl, $C_2$-$C_6$ alkenyl or phenyl or naphthyl;
or X is an isocyanato, thioisocyanato, $-NH_2$, or $-NH(\text{loweralkyl})$;
or X is an acyl, preferably carboxyl, or is an acyl halide, preferably an acyl chloride, or is an acyl ester, preferably of a lower alkyl alcohol, more preferably of a primary alcohol, or an amide, preferably of a lower alkyl amine, more preferably of a lower alkyl primary amine
or X is a carbamoyl of the formula

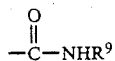 (XI)

wherein $R^9$ is H, lower alkyl or amino lower alkyl or X is an ether of the formula —O—$R^{10}$ wherein $R^{10}$ is lower alkyl or a cyclic ether having a total of 4 to 7 ring members only one of which is oxygen, the remaining ring members being carbon, or X is hydroxy. Preferably G is selected from (a) morpholino which is unsubstituted or mono- tetra substituted by lower alkyl, preferably methyl or ethyl;

(b) an amide of the formula

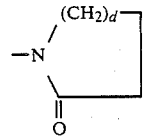 (XII)

wherein d is 1–3, preferably 1; each of which is unsubstituted or substituted, preferably mono or di substituted, by lower alkyl, preferably methyl or ethyl;

(c)

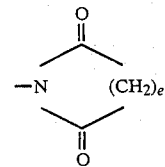 (XIII)

wherein e is 2–3, preferably 2, each of which is unsubstituted or substituted by lower alkyl, preferably methyl or ethyl;

(d) a divalent group of the formulae

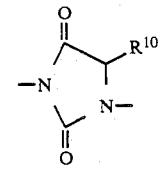 (XIV)

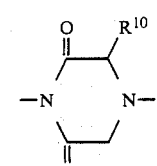 (XV)

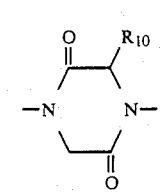 (XVA)

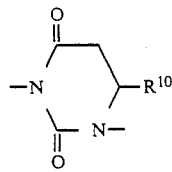 (XVI)

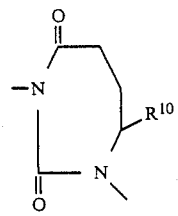 (XVII)

wherein $R^{10}$ is H or COOH;

(e)

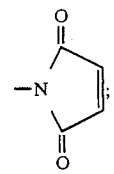

(f)

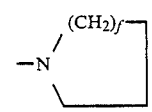 (XVIII)

wherein f is one or two, each of which is unsubstituted or substituted by lower alkyl, preferably methyl or ethyl;

(g)

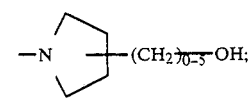

(h) a polyolyl selected from (i) polyvinyl alcohol radicals, (ii) groups of the formulae

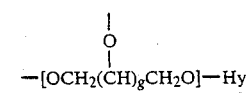

wherein g is 2–10 and y is an integer from 0.5 g up to g+1 inclusive, preferably from g−2 up to g+1 inclusive; cyclic saccharide analogs thereof; di-tetra saccharides thereof, preferably having saccharide-saccharide links between the 1 and 4 carbon positions, preferably β links; (iii) C(CH$_2$O)$_4$H$_i$ wherein i is 0–3; and (iv) polyhydroxy lower alkylene, preferably C$_{2-3}$ alkylene, glycol radicals; wherein in (i) and (iv) above, up to 50%, preferably up to 25%, more preferably 10%, of the hydroxy groups are missing their alcoholic hydrogens.

More preferably, X is an ethylenically unsaturated group, i.e. vinyl, 1-lower alkyl vinyl, 2-lower alkyl vinyl, or 1,2-di(lower alkyl)vinyl, most preferably vinyl, 1-methyl vinyl, or allyl.

G is most preferably pyrrolid-5-one-1-yl, morpholin-1-yl,

radicals [HOCH$_2$]$_3$C-CH$_2$O—, or polyvinylalcohol radicals.

T is most preferably an alkyl of 2–6 carbons which is terminated on one side of carbonyl-oxy, the carbonyl being bound to X, and (a) interrupted once by $$\overset{O}{\underset{\|}{-NHCO-}}$$

or (b) terminated at the other side by $$\overset{O}{\underset{\|}{-NHC-}},$$

the carbonyl being bound to G, preferably the carbonyl being bound to an oxygen atom G. The alkyl of T is most preferably of 2 or 4 carbon atoms.

A second most preferably group T is a divalent (aliphatic)$_a$-aryl-(aliphatic)$_b$ wherein a and b are each 1, each aliphatic is terminated, on the side bound to the aryl by $$\overset{O}{\underset{\|}{-NHCO-}},$$

the nitrogen of each being bound to the aryl, one aliphatic group being terminated on the other side by carbonyl oxy, with the carbonyl group of the carbonyloxy being bound to X. In such groups the aryl is preferably a phenyl or naphthyl, unsubstituted or substituted by halogen or C$_{1-4}$ alkyl, most preferably substituted by methyl. In such groups, each of the aliphatic groups is preferably an alkyl of up to 10 carbon atoms, most preferably up to 5 carbon atoms. Most preferably such aliphatic groups are —CH$_2$CH$_2$—.

The most highly preferred monomers of the invention are:

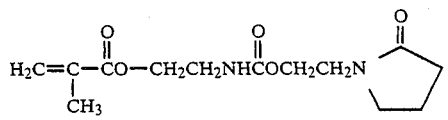  (XIX)

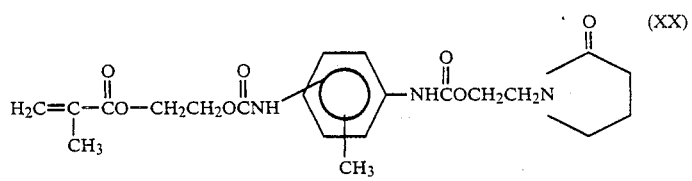  (XX)

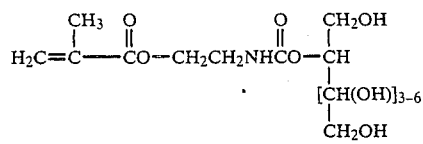  (XXI)

  (XXII)

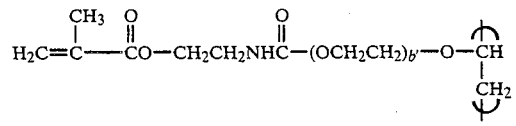  (XXIII)

where b' is the number of repeating units in a typical polyethyleneglycol, especially on average 1 to 20, and formula XXIII represents a portion of a modified polyvinylalcohol macromer; and

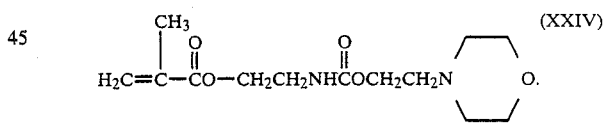  (XXIV)

of these, the monomers of formulae XIX–XXII and XXIV are especially preferred, and most especially those of formulae XIX, XV and XXIV.

The hydrophilic modifying monomers of the invention can be made in a number of ways, the individual steps of which are known in the art. The starting materials are all well known to those in the art and most are commerically available.

One set of starting materials is X-E, W-L-Y, and F-G wherein E is coreative with W, and Y is coreactive with F. When the reactions of E with W and Y with F are complete, the group -EW-L-YF- is -T-. The group -L- can be a simple aliphatic hydrocarbon chain without any substituents or interruptions or terminating groups. Alternatively, it can be a complex group having a number of interrupting and/or terminating groups as well as substituents.

For example, toluene diisocyanate can represent a simple W-L-Y compound. Reaction of 1 mole thereof with 1 mole of N-hydroxyethyl pyrrolidone (an F-G compound) yields a compound of the formula

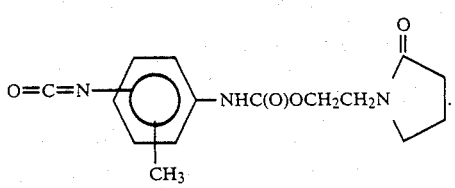

This can then be reacted with 1 mole of 2-hydroxyethylmethacrylate (an X-E compound) to yield the compound of formula XX. More complex similar structures can be prepared by reacting 1 mole of toluene diisocyanate with 2 moles of ethylene glycol to yield a compound of the formula

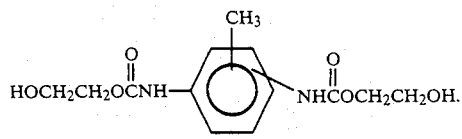

Depending on the final desired compound, one mole of this can be reacted with (a) 1 mole of an isocyanato-G type compound, such as N-(2-isocyanatoethyl)pyrrolidone, and then 1 mole of an isocyanato methacrylate to yeild a monomer of the invention or (b) 2 moles of a diisocyanato compound which can then be reacted with N-(2-hydroxyethyl)pyrrolidone and 2-hydroxyethylmethacrylate (HEMA) to yield a compound similar to that of formula XX but having 4 interrupting groups and one terminating group.

The sequence of reactions can, of course be reversed so that the X-E compound and the W-L-Y compound are first reacted and then F-G compound is reacted with the result. Of course, when F is not reactive with E or X and E is not reactive with F or G all three components can be added together simultaneously.

The compound of formula XIX can likewise be prepared from isocyanatoethylmethacrylate (IEM) and 2-hydroxyethyl pyrrolidone. Similarly, compounds of formulae XXI–XXIII can be prepared from IEM and hydroxy containing compounds, i.e. a $HOCH_2[CH(OH)]_{4-7}CH_2OH$ for formula XXI, $C(CH_2OH)_4$ for formula XXII, and ethoxylated poly vinyl alcohol for formula XXIII.

As one of ordinary skill can appreciate, replacing the above vinyl group (part of the IEM) with an appropriate X group yields any of the desired X terminated compounds. Similarly, replacing the N-(2-hydroxyethyl)pyrrolidone with a N-(2-hydroxyethyl)morpholine yields the product shown in formula XXIV. Synthetic routes to the rest of the monomers within the invention are within the ability of one of ordinary skill in this art.

Based on the foregoing, the following examples are presented to illustrate, but not limit the invention.

EXAMPLE 1

To 25.0 g of ethoxylated PVA (which had been previously dried in a vacuum desicator using $P_2O_5$) was added 150 g of dry DMSO and 0.004% Stannous Octonate. The mixture was stirred for 90 minutes to ensure that complete solubilization was achieved. To this was added 1% by weight Styrene Isocyanate (0.26 g, 0.0017 mol). The reactions completeness was monitored by the disappearance of the isocyanate peak by FT IR. The solution can be used as a hydrophilic modifier as is.

EXAMPLE 2

The procedure of Example 1 is followed; however 0.0017 mole of isocyanatoethylmethacrylate is used in place of the styrene isocyanate.

EXAMPLE 3

To 25.0 g of PVA (Average M.W.=16,000, 98% Hydrolyzed, which had been previously dried in a vacuum desicator using $P_2O_5$) was added 150 g of dry DMSO and 0.004% Stannous Octonate. The mixture was stirred for 90 minutes to ensure that complete solubilization was achieved. To this was added 0.5% by weight Styrene Isocyanate (0.126 g, 0.0017 mol). The reactions completeness was monitored by the disappearance of the isocyanate peak by FT IR.

EXAMPLE 4

The procedure of Example 3 is followed; however 0.0017 mole of isocyanatoethylmethacrylate is used in place of styrene isocyanate.

EXAMPLE 5

To 25.0 g of PVA (Average M.W.=86,000, 88% Hydrolyzed, which had been previously dried in a vacuum desicator using $P_2O_5$) was added 150 g of dry DMSO and 0.004% Stannous Octonate. The mixture was stirred for 90 minutes to ensure that complete solubilization was achieved. To this was added 0.5% by weight Styrene Isocyanate (0.135 g, 0.0008 mol). The reactions completeness was monitored by the disappearance of the isocyanate peak by FT IR.

EXAMPLE 6

The procedure of Example 5 is followed using 0.00085 mole of isocyanato ethyl methacrylate instead of styrene isocyanate.

EXAMPLE 7

One mole of glycidol is introduced into a flask and to it is added 0.74 g (0.013 mol) KOH. The mixture is placed into a constant temperature bath overnight at 23–27 C. To the mixture is added methanol which is then neutralized with Amberlite IR-120-H resin. The solution is then filtered and the methanol is removed. The material is now dried in a vacuum dessicator for 2 days to ensure that it is dry. The material is then introduced into DMSO and reacted with Styrene Isocyanate (0.37 g, 0.0026 mol). The completion of the reaction can be monitored by the disappearance of the isocyanate peak.

EXAMPLE 8

To a clean, dry 100 ml round bottom flask equipped with condenser, nitrogen inlet and thermometer were added 15.53 gm, 0.10 moles isocyanatoethyl methacrylate, 0.02 gm dibutyl tin dilaurate and 50 ml methylene chloride. The mixture was stirred under a nitrogen atmosphere to effect solution. To the solution was added 12.93 gm, 0.10 moles hydroxyethyl pyrrolidone. After 1.5 hours the isocyanate band was not observed in the FT infrared spectrum. The solvent was removed via stirring under a dry-air purge.

EXAMPLE 9

The above modifiers of Examples 1–8 are added to (a) styrene isocyanate endcapped polypropylene glycol 4000, (b) the monomers of formula V of U.S. Pat. No. 4,780,488 or (c) the monomers of formula I of U.S. Pat. No. 4,740,533 in amounts of 10% or 15% by weight and cured. The resulting polymers all have increased water content over the corresponding polymer without the compounds of Examples 1-8 present.

What is claimed is:

1. A compound of the formula

X-T-G wherein
  X is vinyl, 1-lower alkyl vinyl, 2-lower alkyl vinyl or 1,2-di-lower alkyl vinyl,
  T is alkylene of 2 to 6 carbon atoms terminated on one side by carbonyloxy, the carbonyl group being bound to X, with T being interrupted once by —NHCOO—; or
  T is a divalent aliphatic-arylene-aliphatic group wherein each aliphatic group is alkylene of 1 to 6 carbon atoms and is terminated on one side bound to the arylene by —NHCOO— the nitrogen of each being bound to the arylene, one aliphatic group being terminated on the other end by carbonyloxy with the carbonyl group being bound to X, and where the arylene is of 6 to 10 carbon atoms and may be substituted by alkyl of 1 to 4 carbon atoms; and G is an amido group of the formula

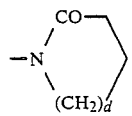

which group G is unsubstituted or substituted by lower alkyl, and where d is 1-3.

2. A compound according to claim 1 in which X is vinyl, 1-methylvinyl, 2-methylvinyl or 1,2-dimethylvinyl.

3. A compound according to claim 1 in which G is unsubstituted or is substituted by one or two alkyl of 1 or 2 carbon atoms, and d is 1.

4. A compound according to claim 1 wherein T is

—COOCH$_2$CH$_2$NHCOOCH$_2$CH$_2$— or

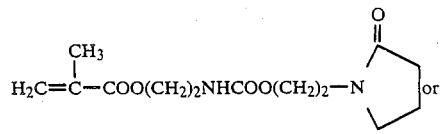

5. The compound according to claim 1 which is

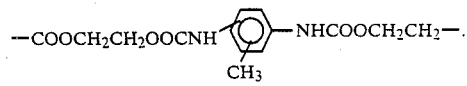

or

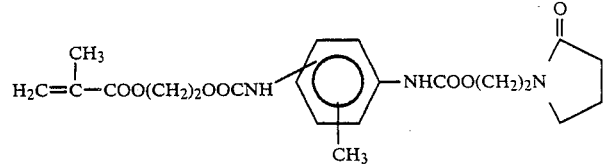

* * * * *